Figure 1:
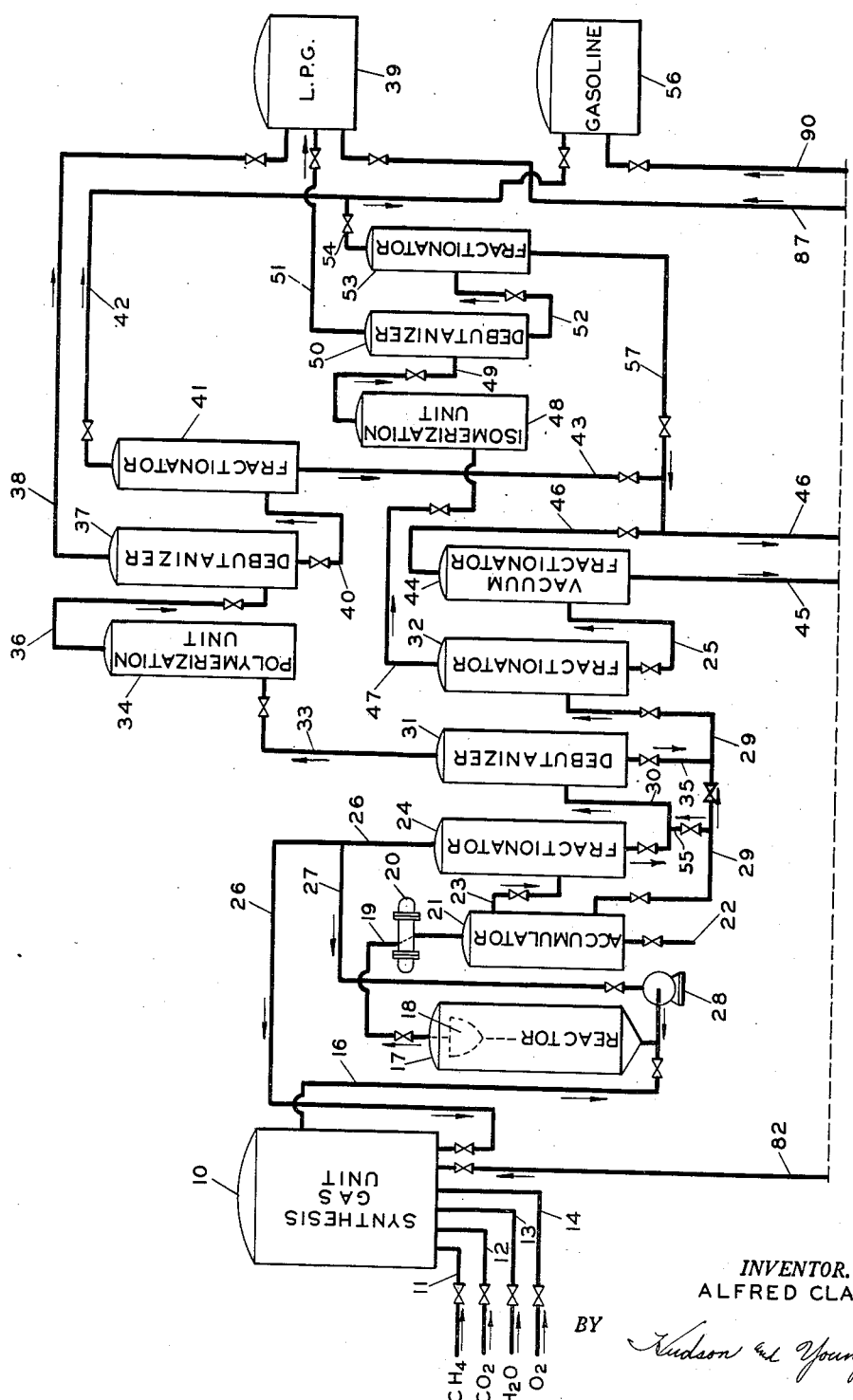

April 19, 1949.

A. CLARK 2,467,966

CONVERSION OF HYDROCARBONS

Filed Jan. 2, 1948

3 Sheets-Sheet 1

INVENTOR.
ALFRED CLARK
BY
*Hudson and Young*
ATTORNEYS

INVENTOR.
ALFRED CLARK
BY Nudson and Young
ATTORNEYS

Patented Apr. 19, 1949

2,467,966

UNITED STATES PATENT OFFICE 2,467,966

CONVERSION OF HYDROCARBONS

Alfred Clark, Bartlesville, Okla., assignor to Phillips Petroleum Company, a corporation of Delaware Application January 2, 1948, Serial No. 238

5 Claims. (Cl. 260—450)

This invention relates to a process for the production of motor fuel. In one of its more specific aspects it relates to a process for the manufacture of premium quality gasoline and Diesel fuel with minimum amounts of light gases and virtually no heavy residues. In a specific embodiment it relates to a process for the manufacture of premium quality gasoline and Diesel fuel from products of a Fischer-Tropsch synthesis and hydrogenolysis.

The Fischer-Tropsch synthesis is a process whereby carbon monoxide and hydrogen are reacted with one another in various proportions to produce primarily hydrocarbons. This synthesis takes place over suitable catalysts such as iron, nickel, or cobalt, and at suitable reaction conditions. Originally, the Fischer-Tropsch synthesis utilized a fixed catalyst bed through which the synthesis gas was passed. In this method of operation, the volume of product hydrocarbons was relatively small for the volume of catalyst used and the overall expense of the process. A great improvement of the Fischer-Tropsch process was made when it was adapted to a fluid type catalyst operation. This particular type of operation uses a finely divided catalyst in a powdered form which is maintained suspended within the reactor by the flow of the charge gases. Under certain conditions it may be desirable to recycle a portion of the effluent products to provide sufficient flow to keep the powdered catalyst in suspension. Several improvements were made by this method of operation; among them are the following: the size of the reactor was reduced, better temperature control was attained, the catalyst was easily regenerated without shutting down the reactor, and higher throughput and conversion and greater economy of operation were obtained.

The Fischer-Tropsch process of forming hydrocarbons from hydrogen and carbon monoxide, when operated using a fluid iron catalyst, produces gasoline and a highly olefinic light hydrocarbon fraction especially suitable for polymerization and subsequent use as gasoline components; however, the Diesel fuel product is below premium quality. A fluid iron catalyst as referred to herein comprises finely divided iron oxide ($Fe_3O_4$) which has been reduced, promoted with minor portions of potassium oxide ($K_2O$) and aluminum oxide ($Al_2O_3$). Some of the advantages of using an iron catalyst over the others are its ease of preparation, abundance, and relative cheapness. It is not definitely understood why the Diesel fuel produced by the Fischer-Tropsch process is below standard, which is known to those skilled in the art, but it is believed to relate partially to the olefin content. It is well known that a process which produces high octane gasoline constituents usually produces Diesel fuels of less than premium quality.

Converse to the gasoline and Diesel fuel products of a Fischer-Tropsch synthesis are the products of a hydrogenolysis of heavy petroleum oils, such as reduced crudes. Reduced crude as referred to hereinafter is a crude oil from which the light materials and gasoline boiling range constituents have been removed, and which has then been distilled at reduced pressure to remove the gas oils present; the initial boiling point of such an oil is usually about 700° F., although this may vary somewhat. Diesel fuels produced by such a hydrogenolysis process are of premium quality and the gasoline is below premium quality. The gasoline range materials are substantially saturated and thus somewhat less advantageous as gasoline components. It is well known to those skilled in the art that olefinic components are particularly desirable in gasoline, especially those boiling below the mid boiling point of the gasoline. A comparison of the cetane ratings of Diesel fuel produced by Fischer-Tropsch synthesis over an iron catalyst and by hydrogenolysis of a reduced crude shows that the Diesel fuel product from hydrogenolysis is about 18 cetane numbers above that from the Fischer-Tropsch synthesis.

It will be highly advantageous, to the petroleum industry in particular, to have a process whereby both premium grade Diesel fuel and premium grade gasoline may be produced. Such a process would provide greater economy in operation and a substantial reduction in the volume of equipment required.

An object of this invention is to provide an improved process for the production of premium quality motor fuel by a combined process of Fischer-Tropsch synthesis and hydrogenolysis of heavy oil. Another object of this invention is the production of premium quality gasoline and Diesel fuel by a combined process of Fischer-Tropsch synthesis and hydrogenolysis of heavy oils. Another object is to produce premium quality gasoline and Diesel fuel with a minimum of light gases and residue. Another object is the economical production of premium quality gasoline and Diesel fuel. Other objects and advantages of this invention will be apparent to one skilled in the art, from the accompanying disclosure and discussion.

I have discovered that a Fischer-Tropsch process and a hydrogenolysis process may be used simultaneously and in conjunction with one another, in such a manner as is described hereinafter to produce both premium quality gasoline and premium quality Diesel fuel. In addition, a minimum of light gases boiling below the gasoline range and practically no heavy residue boiling above the Diesel fuel range are formed.

One preferred embodiment of my invention may be briefly stated as follows. Methane plus carbon dioxide, steam or oxygen, or a mixture of methane and any or all of the last three, are converted into synthesis gas containing carbon monoxide and hydrogen by heating to an elevated temperature and contacting with a nickel catalyst. The synthesis gas may also be produced by a number of other methods, and the scope of this invention is not to be limited by the means of producing same, the above merely being given as an example of one method. The carbon monoxide and hydrogen are then converted in the presence of a finely divided iron catalyst to hydrocarbon compounds, which are mainly olefins and paraffins of the aliphatic type, and oxygen-containing compounds, such as alcohols, aldehydes, and the like. The products of this synthesis are fractionated and separated into a light gas fraction, a $C_3$—$C_4$ fraction containing olefins and paraffins, a gasoline fraction, a gas oil fraction, and a residue boiling above the gas oil range. A portion of the light gas is recycled to the synthesis gas producer and the remainder is recycled to the synthesis reactor by means of a blower to maintain the finely divided catalyst in a fluid state. The $C_3$ and $C_4$ hydrocarbons are passed to a polymerization unit from which the product is separated into $C_3$ and $C_4$ paraffins which are recovered as liquefied petroleum gases, polymer gasoline (recovered as such), and residue. Gasoline range hydrocarbons which are products of the Fischer-Tropsch reaction are passed to an isomerization unit where olefins contained therein are isomerized to higher octane rating materials, and from which the products are separated into $C_3$ and $C_4$ hydrocarbons recovered as LPG (liquefied petroleum gases), gasoline range hydrocarbons of improved octane rating which are combined with those from the polymerization unit, and light gas oil.

In a hydrogenolysis unit which is an integral part of this invention, reduced crude (crude from which light gases, gasoline, and gas oil have been removed by distillation), residue from the Fischer-Tropsch unit, hydrogenolysis recycle residue, and hydrogen are treated over a hydrogenolysis catalyst, and the product is separated into recycle hydrogen which goes back to the hydrogenolysis reactor, light gases and gasoline, and residue. The light gases and gasoline together with residue from the polymerization unit, plus gas oil from the Fischer-Tropsch synthesis, are polyformed or hydroformed. Polyforming is a noncatalytic process which effects alkylation and hydrogen transfer reactions within the materials, improving their octane rating. Hydroforming is a process whereby open-chain hydrocarbons are cyclized in the presence of hydrogen to give materials of improved octane rating. The products from polyforming or hydroforming are separated into light gases, which may be recycled to the Fischer-Tropsch unit, and/or the polyforming or hydroforming unit; $C_3$ and $C_4$ hydrocarbons which are recovered as LPG; and residue, which in turn is separated into a fraction boiling within the gasoline range which is combined as product with the corresponding fractions from the hydrogenolysis, Fischer-Tropsch, polymerization, and isomerization units; and bottoms comprising light gas oil and heavier materials which are recycled to the hydrogenolysis reactor. The residue from the hydrogenolysis unit is separated into premium quality Diesel fuel, recovered as such, and heavy residue which is recycled to the hydrogenolysis reactor.

Figure 1A:
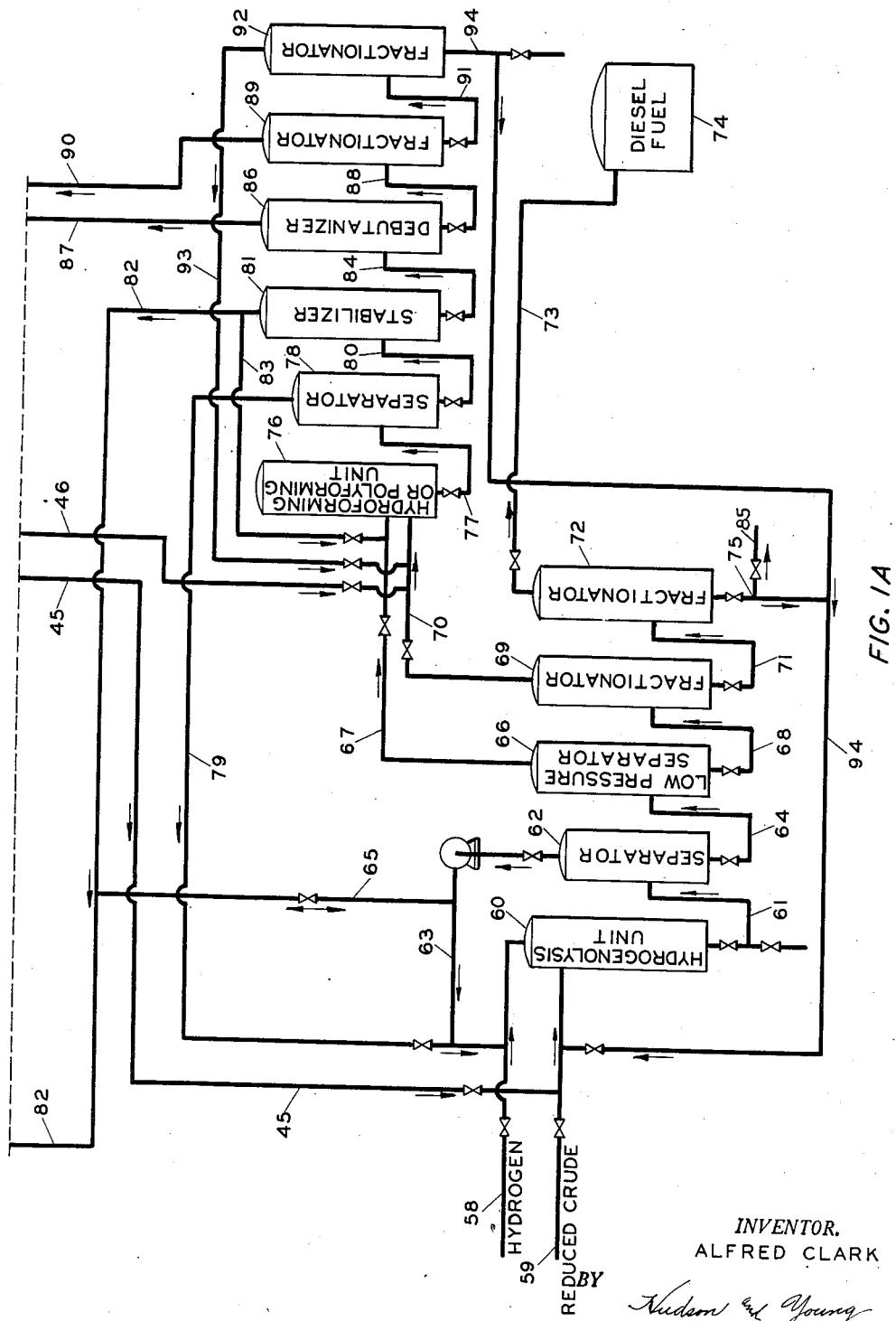
Figure 2:
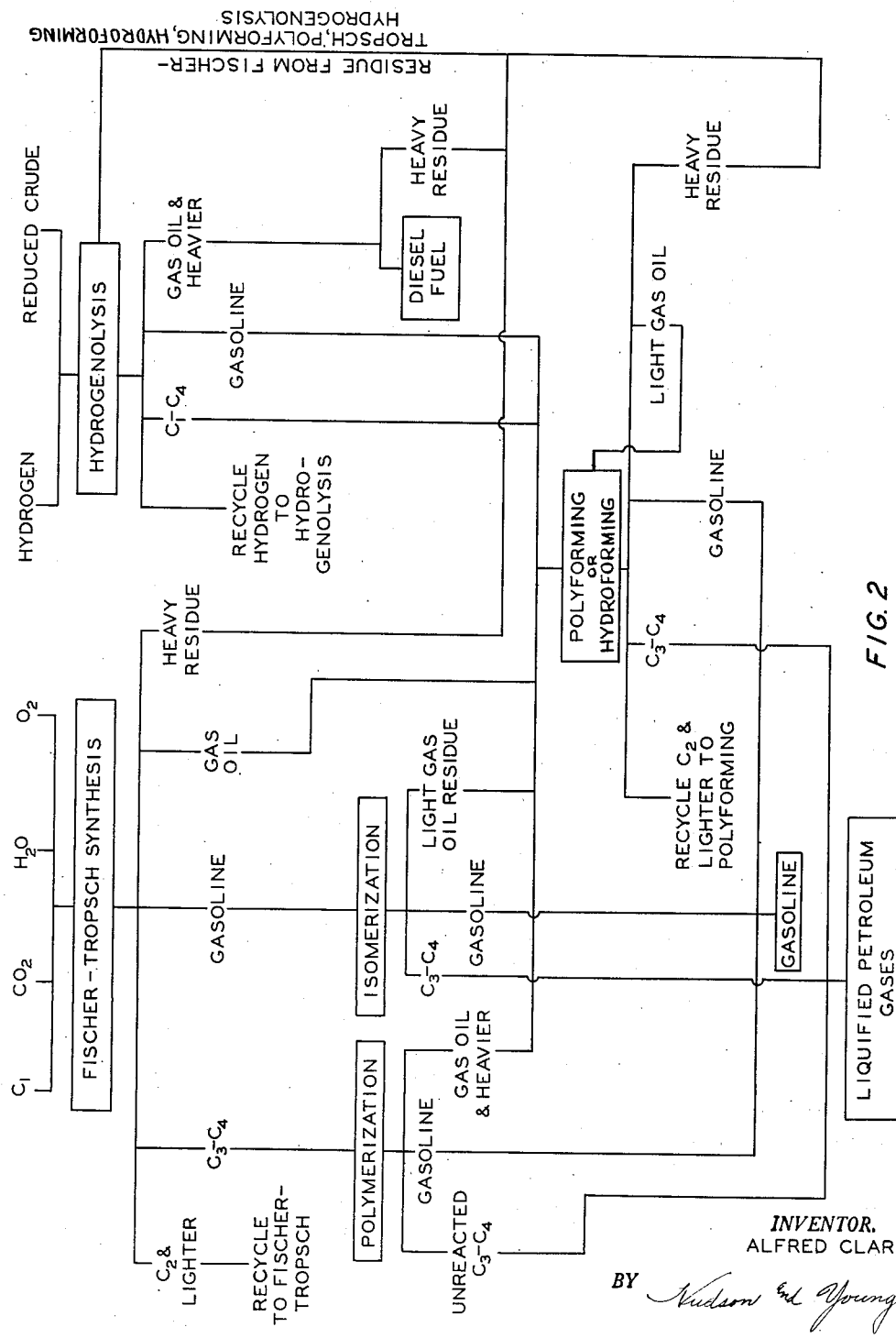

A further understanding of some of the more specific aspects of my invention may be had by referring to the attached drawing which is a schematic flow diagram of a preferred embodiment. To follow the flow diagram, place Figures 1 and 1A together on the dashed lines. Figure 2 is included to show more clearly the relation between the individual steps of the process, and may be referred to along with the flow diagram. The following description will also serve to exemplify the invention.

Methane, carbon dioxide, steam, and oxygen may be introduced to Fischer-Tropsch gas producing unit 10 through lines 11, 12, 13, and 14, respectively. Synthesis gas may be made from a combination of methane and any one or all of the group consisting of carbon dioxide, steam, and oxygen at a temperature in the range of 1400 to 2000° F., in contact with a suitable catalyst such as a nickel catalyst, as is well understood in the art. Resulting synthesis gas, which contains hydrogen and carbon monoxide in a preferred molar ratio of about 2:1, is passed from unit 10 through line 16 to reactor 17 where it is contacted at suitable conditions with a Fischer-Tropsch catalyst, such as with reduced iron oxide at a temperature of 540 to 625° F. and at a pressure of 70 to 450 pounds per square inch, or with cobalt-thoria at a temperature of 320 to 420° F. and a pressure of 70 to 450 pounds per square inch, thereby forming hydrocarbon materials. At times it may be desirable to use other temperatures lying within the range of 250 to 750° F. Vaporous reaction products, which include olefins, paraffins, alcohols, aldehydes, and water are separated from the catalyst by means of a cyclone separator 18, and are withdrawn through line 19 and partial condenser 20 to accumulator 21. An aqueous phase is removed from accumulator 21 through line 22, and vaporous materials are passed to fractionator 24 through line 23. From fractionator 24 light gases are removed for recycle, a portion going to synthesis gas unit 10 through line 26, and the remainder going to reactor 17 through lines 26 and 27, blower 28 and line 16. The liquid hydrocarbon layer in accumulator 21 is withdrawn through line 29 and may be passed to debutanizer 31 through lines 55 and 30 along with the bottoms from fractionator 24, and/or to fractionator 32 through line 29. In debutanizer 31 the $C_3$ and $C_4$ hydrocarbons are separated, and removed through line 33 to polymerization unit 34, while the residue is passed through lines 35 and 29 to fractionator 32. Fractionator 32 is operated to produce a gasoline boiling range fraction overhead removed through line 47. The bottoms from fractionator 32 are removed through line 25 to vacuum fractionator 44 where gas oil is separated and removed overhead through line 46.

A suitable polymerization catalyst, such as hot sulfuric acid, at a temperature in the neighborhood of 175° F., or solid phosphoric acid (phosphoric acid supported on a siliceous material) at a temperature in the range of 500 to 600° F., is used in unit 34 to polymerize unsaturated $C_3$ and $C_4$ hydrocarbons charged thereto. However, other olefin polymerization catalysts known to the art may be used, if desired. It is preferred that the polymerization conditions of temperature, pressure, and contact time be so chosen, with respect to the particular catalyst used, that polymers boiling in the gasoline range are produced. Generally, a pressure sufficient to insure liquid- or dense-phase operation is preferred, and the reaction temperature will be between 50 and 600° F. and broadly between 0 and 800° F., depending on the catalyst and the concentrations of the various olefins. Reaction effluent from polymerization unit 34 is passed through line 36 to debutanizer 37 where unpolymerized $C_3$ and $C_4$ hydrocarbons (chiefly paraffins) are separated and passed through line 38 to LPG storage unit 39. The bottoms from debutanizer 37 are passed through line 40 to fractionator 41 where hydrocarbons boiling in the gasoline range are recovered overhead as polymer gasoline and passed through line 42 to gasoline storage unit 56. The bottoms from fractionator 41 are removed through line 43 and passed through line 57 to line 46, through which they are carried together with the gas oil overhead from fractionator 44 which separates Fischer-Tropsch gas oil from heavy residues, to the polyforming or hydroforming unit 76.

The gasoline boiling range overhead from fractionator 32 contains olefins and a small amount of oxygen-containing compounds, as well as saturated hydrocarbons. This mixture is removed through line 47 to isomerization unit 48 where it is treated over a suitable catalyst, such as bauxite, acid treated clay, magnesia, or alumina, at temperatures in the range of 600 to 900° F., pressures in the range of 10 to 1500 pounds per square inch gauge, an a liquid space velocity of 0.5 to 10 volumes of charge per volume of catalyst per hour, to remove oxygen-containing compounds and to isomerize olefins to other olefins of higher octane rating. Products from isomerization unit 48 are removed through line 49 to debutanizer 50 where the $C_3$ and $C_4$ hydrocarbons are removed overhead through line 51 and passed to LPG storage unit 39. The bottoms from debutanizer 50 are passed through line 52 to fractionator 53 where gasoline range hydrocarbons are separated and passed through lines 54 and 42 to gasoline storage unit 56. Light gas oil residue from fractionator 53 is removed through line 57 to line 46 where it is passed together with the overhead from fractionator 44 and the bottoms from fractionator 41 to polyforming or hydroforming unit 76.

Reduced crude oil is prepared in a conventional manner (not shown) by removing the light materials and gasoline, and then removing the gas oils at reduced pressure. Hydrogen and the reduced crude boiling above about 700° F. are introduced to hydrogenolysis reactor 60 through lines 58 and 59, respectively, where they are contacted with a suitable hydrogenolysis catalyst, such as molybdenum oxide or molybdenum sulfide at a temperature in the range of 800 to 950° F., pressure in the range of 1000 to 10,000, but preferably in the range of 2000 to 5000, pounds per square inch gauge, and a liquid space velocity of 1 to 10 volumes of charge per volume of catalyst per hour. Hydrogenolysis products which include light gases, gasoline range hydrocarbons, and Diesel fuel and heavier materials are recovered from unit 60 through line 61 and passed to high pressure separator 62, in which high purity hydrogen is removed for recycle to unit 60 through lines 63, 79, and 58. The remaining materials from separator 62 are passed through line 64 to low pressure separator 66 where light materials, comprising about 50 to 60 per cent hydrogen together with methane and lesser portions of $C_2$ to $C_4$ hydrocarbons, are removed through line 67. The remaining materials from low pressure separator 66 are removed through line 68 to fractionator 69 where gasoline range hydrocarbons are separated and removed through line 70. Gas oil and heavier materials from fractionator 69 are passed through line 71 to fractionator 72, where premium Diesel fuel stock is separated and removed through line 73 to Diesel fuel storage unit 74.

Gasoline range hydrocarbons, removed from fractionator 69 through line 70, are polyformed or hydroformed in unit 76 with gas oil from vacuum fractionator 44, gas oil and heavier residue from polymerization fractionator 41, light gas oil residue from isomerization fractionator 53, and gas oil overhead from fractionator 92. Hydrogen and $C_1$ to $C_4$ hydrocarbons may be added to unit 76 from separator 66 through line 67 and/or from stabilizer 81 through lines 82, 83, and 67.

Polyforming is a noncatalytic thermal conversion process utilizing light gases, such as propane or butane, and heavier materials such as naphtha or gas oil. These materials are passed through a heating coil at a temperature in the range of 800 to 1200 F., a pressure in the range of 1000 to 2500 pounds per square inch gauge, and a flow rate such as to give the desired results, the exact value depending on feed stock and the other conditions. The reactions occurring are little understood and quite complex; they may comprise alkylation, hydrogen transfer, cracking, polymerization, and related reactions. In any event, the final product has an improved octane number, and boils in the range between the light gases and the gas oils or naphthas.

Hydroforming is a catalyst process in which gasoline range hydrocarbons are treated over a catalyst, such as molybdena on alumina, chromia on alumina, or vanadia on alumina and in the presence of hydrogen; at a temperature in the range of 600 to 1000° F., a pressure in the range of 150 to 500 pounds per square inch gauge, and a liquid space velocity of 1 to 5 volumes of charge per volume of catalyst per hour. Sufficient hydrogen is used to minimize tar formation and coke deposition on the catalyst. The specific temperature in any operation will depend on the particular catalyst used. Such treatment cyclizes the material treated and improves its octane rating.

Polyforming or hydroforming products are removed from unit 76 through line 77 to separator 78 in which hydrogen and light gases are removed for recycle to hydrogenolysis unit 60 through lines 79 and 58. The remaining material from separator 78 is removed through line 80 to stabilizer 81 where additional light gases are separated for recycle to hydrogenolysis unit 60 through lines 82, 65, 63, 79, and 58, and/or to hydroforming or polyforming unit 76 through lines 82, 83, and 67, and/or to synthesis gas unit 10 through line 82. The $C_3$ and heavier materials from stabilizer 81 are removed through line 84 to debutanizer 86 where $C_2$ and $C_4$ hydrocarbons are removed through line 87 and passed to LPG storage unit 39. Residue from debutanizer 86 is passed through line 88 to fractionator 89, in which gasoline range hydrocarbons are separated and removed to gasoline storage unit 56 through line 90. Gas oil and heavier residue from fractionator 89 is passed through line 91 to fractionator 92, where it is separated, gas oil being removed for recycle through lines 93 and 70 to hydroforming or polyforming unit 76, and heavy residue being removed for recycle through lines 94 and 59 to hydrogenolysis unit 60. Residues boiling above the gas oil range from fractionators 44 and 72 are also recycled to hydrogenolysis unit 60 through lines 45 and 59, and lines 75, 94, and 59, respectively. If it is not desirable to recycle residue from fractionator 72 back to the hydrogenolysis unit, it may be removed through lines 75 and 85.

Various additional valves, pumps, and other conventional equipment necessary for the practice of this invention will be familiar to one skilled in the art and have been omitted for the sake of clarity.

In summary, this invention provides a means for producing both premium quality gasoline and premium quality Diesel fuel by a combination process, comprising a Fischer-Tropsch unit and a hydrogenolysis unit inter-related in such a manner that the steps in each lend themselves to the production of high quality products with a minimum of light gases and practically no heavy residues.

Although this process has been described and exemplified in terms of its preferred modifications, it is understood that various changes may be made without departing from the spirit and scope of the disclosure and of the claims.

I claim:

1. A method for manufacturing gasoline and Diesel fuel in an integrated process with minimum amounts of light gases and virtually no heavy residues, which comprises reacting carbon monoxide and hydrogen to produce hydrocarbons boiling below, in, and above the gasoline range, polymerizing a $C_3$—$C_4$ fraction of said hydrocarbon product, separating products of said polymerization into light gases, gasoline range hydrocarbons, and gas oil and heavier materials, isomerizing gasoline range hydrocarbons from said carbon monoxide-hydrogen reaction to materials of higher octane rating and free of oxygen-containing compounds, passing to a hydrogenolysis unit reduced crude boiling above about 700° F., residue from said carbon monoxide-hydrogen reaction boiling above the gas oil range, recycle residue from said hydrogenolysis unit boiling above the Diesel fuel range, and hydrogen, and subjecting same in the presence of a hydrogenolysis catalyst to destructive hydrogenation, separating a hydrogenolysis product, introducing to a polyforming unit $C_1$ to $C_4$ and gasoline range hydrocarbons from said hydrogenolysis unit, gas oil and heavier residue from said polymerization unit, and gas oil from said carbon monoxide-hydrogen reaction, recovering gasoline from said polymerization, isomerization, and polyforming units as a product of the process, separating the gas oil and heavier residue from said hydrogenolysis unit, recovering Diesel fuel from said residue as a further product of the process, and recycling residues from said hydrogenolysis unit and from said polyforming unit to said hydrogenolysis unit.

2. A method for manufacturing gasoline and Diel fuel in an integrated process with minimum amounts of light gases and virtually no heavy residues, which comprises reacting carbon monoxide and hydrogen to produce hydrocarbons boiling below, in, and above the gasoline range, separating said hydrocarbons into a $C_2$ and lighter fraction, $C_3$—$C_4$ fraction, a gasoline range fraction, a gas oil fraction, and a residue, passing said $C_3$—$C_4$ fraction to a polymerization unit, separating products from said polymerization unit into $C_3$ and $C_4$ hydrocarbons recovered as liquefied petroleum gases, gasoline range hydrocarbons, and gas oil and heavier materials, passing gasoline range hydrocarbons from said carbon monoxide-hydrogen reaction to an isomerization unit, separating the products from said isomerization unit, where their octane rating is improved and where the oxygen-containing materials are removed, into $C_3$ and $C_4$ hydrocarbons recovered as liquefied petroleum gases, gasoline range hydrocarbons of improved properties, and light gas oil, destructively hydrogenating reduced crude boiling above about 700° F., residue from said carbon monoxide-hydrogen reaction boiling above the gas oil range, and recycle residue from said hydrogenolysis unit boiling above the Diesel fuel range with hydrogen over a hydrogenolysis catalyst, separating the products of said hydrogenolysis unit into recycle hydrogen, light gases containing $C_1$ to $C_4$ hydrocarbons, gasoline range hydrocarbons, and gas oil and heavier residue, separating said hydrogenolysis gas oil and heavier residue into Diesel fuel recovered as a product of the process and residue which is recycled to said hydrogenolysis unit, introducing $C_1$ and $C_4$ and gasoline range hydrocarbons from said hydrogenolysis unit, gas oil from said carbon monoxide-hydrogen reaction, light gas oil from said isomerization unit, and gas oil and heavier residue from said polymerization unit to a polyforming unit, recovering from said polyforming unit gasoline range hydrocarbons which are combined with gasoline range hydrocarbons from said polymerization and isomerization units, recovering said combined gasoline range hydrocarbons in the form of gasoline of a high octane rating as a product of the process.

3. A method of manufacturing gasoline and Diesel fuel in an integrated process with minimum amounts of light gases and virtually no heavy residues, which comprises reacting carbon monoxide and hydrogen in the presence of a Fischer-Tropsch type catalyst at a temperature in the range of 250 to 750° F. and a pressure in the range of 70 to 450 pounds per square inch, under conditions producing hydrocarbons boiling below, in, and above the gasoline range, separating said hydrocarbons into a $C_2$ and lighter fracton, a $C_3$—$C_4$ fraction, a gasoline range fraction, a gas oil fraction, and a residue, passing said $C_3$—$C_4$ fraction to a polymerization unit where it is treated in the presence of a polymerization catalyst at a temperature in the range of 0 to 800° F. and an elevated pressure, separating products from said polymerization unit into $C_3$ and $C_4$ hydrocarbons, gasoline range hydrocarbons, and gas oil and heavier residue, passing gasoline range hydrocarbons from said Fischer-Tropsch step to an isomerization unit where they are contacted with an isomerization catalyst at a temperature in the range of 600 to 800° F. and a pressure in the range of about 10 to about 1500 pounds per square inch gauge, separating products from said isomerization unit into $C_3$ and $C_4$ hydrocarbons, gasoline range hydrocarbons, and light gas oil, destructively hydrogenating reduced crude boiling above about 700° F., residue from said carbon monoxide-hydrogen reaction boiling above the gas oil range, and recycle residue from said hydrogenolysis unit boiling above the Diesel fuel range with hydrogen in a hydrogenolysis unit over a suitable hydrogenolysis catalyst at a temperature in the range of about 800 to 950° F. and a pressure in the range of 1000 to 10,000 pounds per square inch gauge, separating products of said hydrogenolysis into recycle hydrogen, light gases containing $C_1$ to $C_4$ hydrocarbons, gasoline range hydrocarbons, and gas oil and heavier residue, separating said hydrogenolysis gas oil and heavier residue into Diesel fuel recovered as a product of the process and residue which is recycled to the hydrogenolysis unit, introducing $C_1$ to $C_4$ and gasoline range hydrocarbons from said hydrogenolysis unit, gas oil from said carbon monoxide-hydrogen reaction, light gas oil from said isomerization unit, and gas oil and heavier residue from said polymerization unit to a polyforming unit where they are treated at a temperature in the range of 800 to 1200° F. and a pressure in the range of 1000 to 2500 pounds per square inch gauge to form high octane gasoline, recovering gasoline range hydrocarbons from said polyforming unit and combining same with gasoline range hydrocarbons from said polymerization and isomerization units, and recovering said combined gasoline range hydrocarbons in the form of gasoline as a product of the process.

4. A method for manufacturing gasoline and Diesel fuel in an integrated process with minimum amounts of light gases and virtually no heavy residue, which comprises reacting carbon monoxide and hydrogen to produce hydrocarbons boiling below, in, and above the gasoline range, polymerizing a $C_3$—$C_4$ fraction of said hydrocarbon product, separating products of said polymerization into light gases, gasoline range hydrocarbons, and gas oil and heavier materials, isomerizing gasoline range hydrocarbons from said carbon monoxide-hydrogen reaction to materials of higher octane rating and free of oxygen-containing compounds, passing to a hydrogenolyis unit reduced crude boiling above about 700° F., residue from said carbon monoxide-hydrogen reaction boiling above the gas oil range, recycle residue from said hydrogenolysis unit boiling above the Diesel fuel range, and hydrogen, and subjecting same in the presence of a hydrogenolysis catalyst to destructive dehydrogenation, separating a hydrogenolysis product, introducing to a high temperature octane improving step $C_1$ to $C_4$ and gasoline range hydrocarbons from said hydrogenolysis unit, gas oil and heavier residue from said polymerization unit, and gas oil from said carbon monoxide-hydrogen reaction, recovering gasoline from said polymerization, isomerization, and octane improving step as a product of the process, separating the gas oil and heavier residue from said hydrogenolysis unit, recovering Diesel fuel from said residue as a further product of the process, and recycling residues from said hydrogenolysis unit and from said octane improving step to said hydrogenolysis unit.

5. A process according to claim 3 wherein said Fischer-Tropsch catalyst is a reduced iron oxide, wherein said polymerization catalyst is hot sulfuric acid, wherein said isomerization catalyst is bauxite, and wherein said hydrogenolysis catalyst is molybdenum sulfide.

ALFRED CLARK.

REFERENCES CITED

The following references are of record in the file of this patent:

UNITED STATES PATENTS

| Number | Name | Date |
| --- | --- | --- |
| 2,286,814 | Kemp | June 16, 1942 |
| 2,352,025 | Seguy | June 20, 1944 |
| 2,354,866 | Lang | Aug. 1, 1944 |
| 2,367,527 | Ridgway | Jan. 16, 1945 |
| 2,371,355 | Ross et al. | Mar. 13, 1945 |

Certificate of Correction

Patent No. 2,467,966.

April 19, 1949.

ALFRED CLARK

It is hereby certified that errors appear in the printed specification of the above numbered patent requiring correction as follows:

Column 5, line 36, for "00° F." read *800° F.*; line 38, for "an a" read *and a*; column 6, line 32, for "1200 F." read *1200° F.*; line 44, for the word "catalyst" read *catalytic*; line 72, for "$C_2$ and $C_4$" read *$C_3$ and $C_4$*; column 7, line 73, claim 2, for "Diel" read *Diesel*; column 8, line 4, claim 2, after the word and comma "fraction," first occurrence, insert *a*; column 9, line 36, claim 4, for "$C_3$—$G_4$" read *$C_3$—$C_4$*; column 10, line 1, claim 4, for "hydrogenolyis" read *hydrogenolysis*; and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*